United States Patent
Reichert et al.

(10) Patent No.: US 12,081,081 B2
(45) Date of Patent: Sep. 3, 2024

(54) METHOD FOR PRODUCING A STACK OF METAL SHEETS, STACK OF METAL SHEETS, MACHINE COMPONENT, ELECTRIC MOTOR AND DRIVE TRAIN

(71) Applicant: ElringKlinger AG, Dettingen (DE)

(72) Inventors: Magnus Reichert, Reutlingen (DE); Michael Schaich, Reutlingen (DE); Florian Hassler, Dettingen (DE); Wojtek Kolasinski, Reutlingen (DE); Peter Braun, Niirtingen (DE); Fabienne Anhorn, Reutlingen (DE)

(73) Assignee: ElringKlinger AG, Dettingen (DE)

( * ) Notice: Subject to any disclaimer, the term of this patent is extended or adjusted under 35 U.S.C. 154(b) by 274 days.

(21) Appl. No.: 17/685,819

(22) Filed: Mar. 3, 2022

(65) Prior Publication Data

US 2022/0271631 A1 Aug. 25, 2022

Related U.S. Application Data

(63) Continuation of application No. PCT/EP2019/082566, filed on Nov. 26, 2019.

(30) Foreign Application Priority Data

Sep. 9, 2019 (DE) ...................... 10 2019 213 658.3

(51) Int. Cl.
*H02K 15/02* (2006.01)
*B32B 15/01* (2006.01)
(Continued)

(52) U.S. Cl.
CPC ............. *H02K 15/02* (2013.01); *B32B 15/01* (2013.01); *B32B 37/1207* (2013.01);
(Continued)

(58) Field of Classification Search
CPC ...... B32B 15/01; B32B 37/1207; H02K 15/02
(Continued)

(56) References Cited

U.S. PATENT DOCUMENTS 3,558,396 A 1/1971 Denyssen
4,413,406 A 11/1983 Bennett et al.
(Continued)

FOREIGN PATENT DOCUMENTS

DE 102014205581 A1 12/2014
DE 102018109008 B3 9/2019
(Continued)

*Primary Examiner* — Rashad H Johnson
(74) *Attorney, Agent, or Firm* — ASLAN LAW, P.C.

(57) ABSTRACT

In order to provide a method by means of which stacks of laminations can be produced in a simple and efficient manner, it is provided that the method comprises the following: coating one or more laminations with a bonding agent; bonding a plurality of laminations to form a sheet metal laminate by means of a first activation of the bonding agent; dividing the sheet metal laminate to produce a plurality of sheet metal laminate units and/or separating out a plurality of sheet metal laminate units from the sheet metal laminate; and bonding the plurality of sheet metal laminate units to form a stack of laminations by means of a second activation of the bonding agent, one or more parameters differing from one another in the first activation and the second activation.

20 Claims, 4 Drawing Sheets

(51) Int. Cl.
 *B32B 37/12* (2006.01)
 *B32B 38/00* (2006.01)
 *H02K 1/12* (2006.01)
 *H02K 1/22* (2006.01)

(52) U.S. Cl.
 CPC ........... *B32B 38/0004* (2013.01); *H02K 1/12* (2013.01); *H02K 1/22* (2013.01); *B32B 2250/03* (2013.01); *B32B 2307/732* (2013.01)

(58) Field of Classification Search
 USPC .................................................. 310/216.004
 See application file for complete search history.

(56) References Cited

U.S. PATENT DOCUMENTS

| | | | | |
|---|---|---|---|---|
| 11,712,880 | B2* | 8/2023 | Kinzelmann | B32B 37/0046 |
| | | | | 156/60 |
| 11,881,350 | B2* | 1/2024 | Bäcker | H02K 1/00 |
| 2013/0295443 | A1* | 11/2013 | Stuth | H01M 50/124 |
| | | | | 228/116 |
| 2016/0101599 | A1* | 4/2016 | Kaiser | B32B 15/012 |
| | | | | 72/46 |
| 2016/0121590 | A1 | 5/2016 | Sulkakoski et al. | |
| 2018/0006509 | A1 | 1/2018 | Kato et al. | |
| 2019/0151926 | A1 | 5/2019 | Koopmans et al. | |
| 2019/0291403 | A1* | 9/2019 | Bursy | B32B 38/04 |
| 2019/0315112 | A1 | 10/2019 | Salje et al. | |
| 2021/0046733 | A1* | 2/2021 | Lanksweirt | B32B 7/12 |
| 2021/0146657 | A1* | 5/2021 | Fluch | B32B 7/12 |
| 2022/0239203 | A1* | 7/2022 | Lewe | H02K 15/02 |
| 2022/0271631 | A1* | 8/2022 | Reichert | H02K 15/02 |
| 2022/0271635 | A1* | 8/2022 | Reichert | H02K 15/02 |
| 2022/0389281 | A1* | 12/2022 | Fluch | B32B 7/025 |
| 2023/0119661 | A1* | 4/2023 | Lewe | H01F 3/02 |
| | | | | 310/216.065 |
| 2023/0415469 | A1* | 12/2023 | Fluch | B32B 15/18 |

FOREIGN PATENT DOCUMENTS

| | | |
|---|---|---|
| JP | S61189930 A | 8/1986 |
| JP | H09215279 A | 8/1997 |
| JP | 2005348456 A | 12/2005 |
| JP | 2007311652 A | 11/2007 |

* cited by examiner

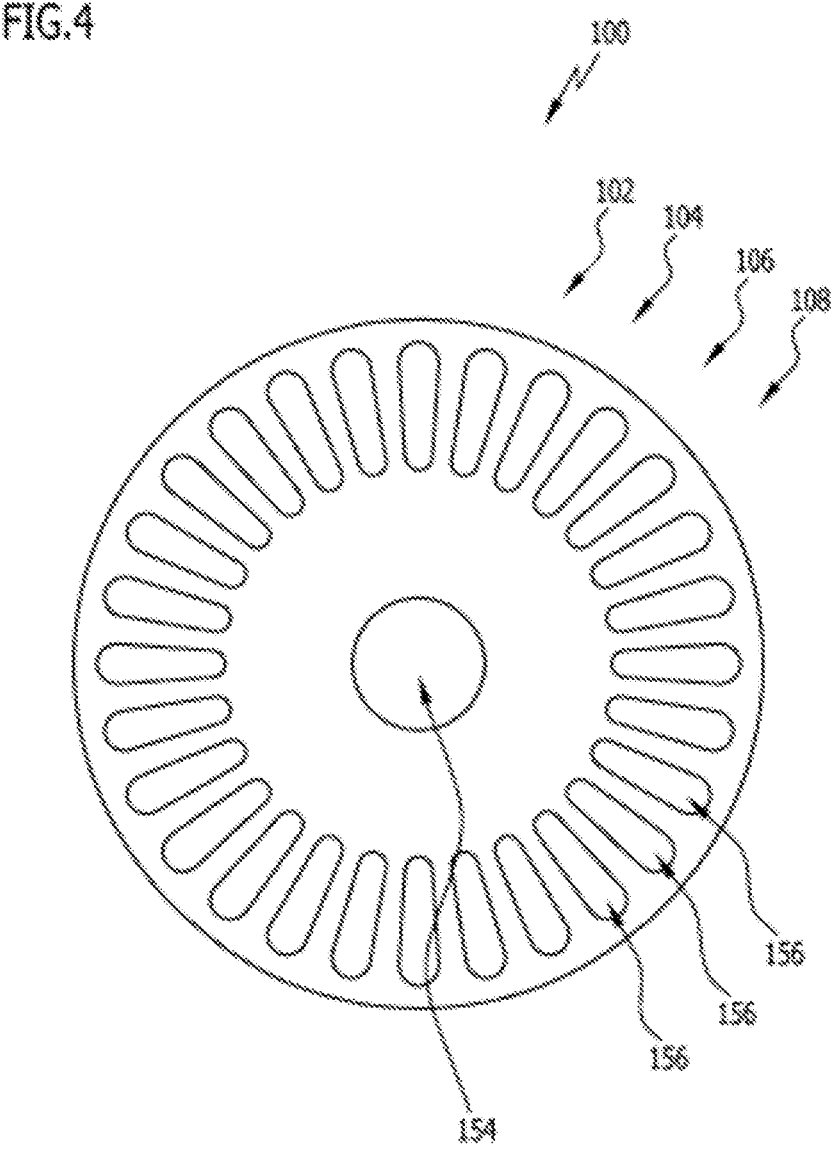

METHOD FOR PRODUCING A STACK OF METAL SHEETS, STACK OF METAL SHEETS, MACHINE COMPONENT, ELECTRIC MOTOR AND DRIVE TRAIN

RELATED APPLICATION

This application is a continuation of international application No. PCT/EP2019/082566 filed on Nov. 26, 2020, and claims the benefit of German application No. 10 2019 213 658.3 filed on Sep. 9, 2019, which are incorporated herein by reference in their entirety and for all purposes.

FIELD OF DISCLOSURE

The present invention relates to a method for producing a stack of laminations, in particular an electrical laminated core.

The invention also relates to a stack of laminations, in particular a rotor core and/or a stator core.

The invention further relates to a machine component, in particular a rotor and/or a stator, as well as to a drive train and to an electric motor.

BACKGROUND

Methods for producing a stack of laminations are known from WO 2014/089593 A1, WO 2012/059588 A1 and WO 2016/033630 A1.

SUMMARY OF THE INVENTION

The object of the present invention is to provide a method by means of which stacks of laminations can be produced in a simple and efficient manner.

This object is achieved by a method according to claim 1.

The method is preferably a method for producing a plurality of stacks of laminations, which method in particular also includes method steps which take place after the actual production up to delivery.

The one or more stacks of laminations are preferably electrical laminated cores.

The method preferably comprises the following:
coating one or more laminations with a bonding agent;
bonding a plurality of laminations to form a sheet metal laminate by means of a first activation of the bonding agent;
dividing the sheet metal laminate to produce a plurality of sheet metal laminate units and/or separating out a plurality of sheet metal laminate units from the sheet metal laminate; and
bonding the plurality of sheet metal laminate units to form a stack of laminations by means of a second activation of the bonding agent.

It can be advantageous if one or more parameters differ from one another in the first activation and the second activation.

Due to the fact that the one or more parameters differ from one another in the first and the second activation, the bonding of the plurality of laminations to form a sheet metal laminate and the bonding of the plurality of sheet metal laminate units can preferably be carried out at different times.

For this purpose, the bonding agent preferably has properties which enable two-stage activation.

In particular, multi-stage, for example two-stage, activation of the bonding agent is possible.

A "parameter" is preferably understood to mean a temperature or a pressure.

In addition to pressure-dependent and/or temperature-dependent activation of the bonding agent, the first activation and/or the second activation can be carried out by setting specific further reaction conditions, for example different pH values.

The bonding of the plurality of laminations by means of the first activation of the bonding agent is preferably integral bonding.

The bonding of the plurality of sheet metal laminate units by means of the second activation of the bonding agent is in particular integral bonding.

It can be favorable if the bonding agent is an adhesive.

A lamination can be coated on both sides with the bonding agent and then a further lamination can be brought into contact with the coatings on both sides of the coated lamination. The three laminations are then preferably bonded together, in particular integrally, by means of the first activation of the bonding agent.

However, two-sided coating of all laminations is preferably carried out.

It has proven to be particularly efficient in the method to coat exactly three laminations with the bonding agent on both sides and then to bond them together.

The stack of laminations is a laminated core, for example.

The laminations are, for example, electrical laminations, in particular comprising an iron-silicon alloy.

It can be favorable if the laminations are produced by cold rolling. In particular, the laminations are finally annealed, for example after the cold rolling.

The one or more laminations are preferably coated with the bonding agent over the entire surface. In this case, a thickness of the bonding agent after the coating is preferably at least approximately constant perpendicularly to a main extension plane of the particular lamination.

The coating of the one or more laminations with the bonding agent is preferably carried out without bubbles and/or without degassing.

For an optimized process flow, it can be favorable if the first activation and the second activation are carried out one after the other.

The method is preferably a continuous method and/or suitable for the series production of stacks of laminations.

It can be advantageous if the bonding of the plurality of laminations to form a sheet metal laminate is carried out "in-line." "In-line" means preferably in a continuous method.

The method is preferably part of a continuous production line in which in particular a locally progressive, time-defined, uninterrupted sequence of work steps is implemented.

It can be favorable if the first activation is thermal activation. Additionally or alternatively, the second activation is thermal activation.

In embodiments in which both the first activation and the second activation are thermal activation, the bonding agent is preferably selected such that it reacts in two different temperature ranges. A chemical and/or physical cross-linking reaction and/or an adhesive-bonding reaction preferably takes place in two different temperature ranges.

It can be advantageous if a first temperature to which the bonding agent is heated during the first activation and a second temperature to which the bonding agent is heated during the second activation differ from one another by approximately 30° C. or more, in particular by approximately 40° C. or more, for example by approximately 50° C. or more.

The first temperature and the second temperature preferably differ from each other by 80° C. or less, in particular approximately 70° C. or less, for example approximately 60° C. or less.

A ratio of the second temperature in the second activation and the first temperature in the first activation is preferably 1.5:1 or more, in particular approximately 2.5:1 or more, for example approximately 3:1 or more.

A ratio of the second temperature in the second activation and the first temperature in the first activation is preferably 4.5:1 or less, in particular approximately 4:1 or less, for example approximately 3.5:1 or less.

As an alternative to the embodiment mentioned, in which both the first activation and the second activation are thermal activation, it can be favorable if the first activation is thermal activation and the second activation is activation by pressure or vice versa.

According to a further alternative, both the first activation and the second activation are activation by pressure.

In the case of activation by pressure, the elements to be bonded are preferably pressed against one another in a bonding direction. The bonding direction is preferably substantially perpendicular to a main extension plane of the laminations or of the sheet metal laminate units.

Additionally or alternatively, a reaction chamber in which the particular activation is carried out can be subjected to a positive pressure or a negative pressure, and activation by pressure is thus carried out.

Additionally or alternatively, the first activation and/or the second activation can be chemical activation.

In the case of chemical activation, a reaction starting substance, for example a radical initiator and/or a cross-linking agent, is preferably added to the bonding agent at the time of activation. For example, a gas is introduced into the reaction chamber.

It can be advantageous if the plurality of laminations that are bonded together is provided in a wound form. In particular, the one or more laminations are unwound for coating with the bonding agent.

For example, the laminations are provided in a form in which they are wound into a coil.

It can be advantageous if the sheet metal laminate resulting from the bonding of the laminations is wound before it is treated in the further process. For further processing of the sheet metal laminate, said laminate is in particular unwound.

To produce the sheet metal laminate, the plurality of laminations are preferably brought into contact with one another and/or pressed together on their aligned flat sides after the coating process.

The laminations arranged one above the other can be pressed together in a pressing tool, for example a press. The pressing together preferably takes place substantially perpendicularly to a main extension plane of the laminations.

The laminations coated with the bonding agent can also be pressed together by rolls, through which the laminations arranged one above the other and coated with the bonding agent are guided.

In embodiments in which the plurality of laminations are electrical laminations, a plurality of laminations can be arranged in different orientations with respect to a pressing direction before the laminations are bonded, in particular integrally. Thus, due to a material anisotropy of the electrical laminations, an increased level of efficiency can be produced in the form of the stator core and/or rotor core of the stack of laminations.

Electrical laminations that follow one another in a stacking direction are preferably stacked one above the other in a manner rotated by approximately 30° to approximately 120° with respect to a main grain orientation direction.

In this way, an increase in efficiency can be achieved in a resulting electrical laminated core, which is used in a stator and/or rotor, with the same or reduced costs.

For example, two laminations are arranged transversely and two laminations are arranged longitudinally in a pressing tool, for example in a press.

Alternatively or additionally, before the bonding by means of the second activation of the bonding agent, a plurality of sheet metal laminate units can be stacked one above the other such that main grain orientation directions are arranged so as to be offset with respect to one another in a stacking direction of laminations arranged one above the other in the individual sheet metal laminate units.

The main grain orientation directions of different laminations in the resulting stack of laminations are preferably not parallel, in particular are skewed.

The sheet metal laminate is preferably a flat material which comprises a plurality of layers of laminations which are integrally bonded together by the bonding agent.

The plurality of laminations can be provided on a roll and/or in a form in which they are wound into a roll. A width of the roll transverse to a winding direction is preferably approximately 100 mm or more, in particular approximately 120 mm or more, for example approximately 130 mm or more.

The width of the roll is preferably approximately 350 mm or less, in particular approximately 300 mm or less, for example approximately 200 mm or less.

For example, the rolls are approximately 157.5 mm wide, in particular for the production of a rotor.

Alternatively, the rolls have a width of approximately 200 mm or more, for example a width in a range of approximately 300 mm to approximately 350 mm, in particular for the production of a stator.

Due to the fact that wider rolls are used for the production of the stator than for the production of the rotor, the stators and rotors can be produced in particular such that the diameters of the stators are larger than the diameters of the rotors.

An outside diameter of one or more stators is preferably larger than an outside diameter of one or more rotors.

In particular, the one or more stators and the one or more rotors can be fastened relative to one another such that the one or more stators surround the one or more rotors.

Before and/or after the division of the sheet metal laminate and/or the separating out of the plurality of sheet metal laminate units, a plurality of sheet metal laminate units can be stacked one on top of the other or one above the other in a stacking direction, so that in particular a stack of sheet metal laminate units is formed.

It can be favorable if the sheet metal laminate units are produced individually and/or are separated out from the sheet metal laminate and then stacked one on top of the other before they are integrally bonded together.

A plurality of sheet metal laminates can be divided at the same time.

The stacking direction is preferably perpendicular to a main extension plane of the sheet metal laminate and/or a main extension plane of a lamination.

It can be advantageous if the plurality of laminations is provided in a pre-coated form, in particular pre-coated on both sides.

The pre-coating preferably comprises one or more of the following agents or is formed from one or more of the following agents: polyvinyl butyral, polyamide, polyester, modified polyamide, and epoxy.

The pre-coating serves in particular to improve the adhesion of the bonding agent to a lamination surface.

What is referred to as "baking varnish," for example, is suitable as a pre-coating.

The pre-coating is preferably already cured when the bonding agent is deposited.

It can be favorable if the pre-coating is electrically insulating.

"Electrically insulating" preferably means that a material and/or component and/or element characterized in this way has an electrical conductivity of approximately $10^{-7}$ S·cm$^{-1}$ or less, in particular approximately $10^{-8}$ S·cm$^{-1}$ or less. The values are based on measurements under standard conditions.

As already mentioned, it is particularly preferred if the plurality of laminations are each coated with the bonding agent on both sides.

A solvent can be added to the bonding agent before the coating, which solvent escapes in particular directly after the coating and/or during the first activation.

It can be favorable if a ratio between a thickness of the one or more laminations and a layer thickness of the bonding agent is in a range of approximately 20:1 or more, in particular 25:1 or more.

The ratio between the thickness of the one or more laminations and the layer thickness of the bonding agent is preferably approximately 250:1 or less, in particular approximately 210:1 or less.

The layer thickness of the bonding agent after application and/or after the first activation is preferably approximately 1 µm or more, in particular approximately 4 µm or more, for example approximately 5 µm or more.

After the application and/or after the first activation, the layer thickness of the bonding agent is preferably approximately 9 µm or less, in particular approximately 8 µm or less, for example approximately 7 µm or less.

For example, the layer thickness of the bonding agent is approximately 6 µm.

The layer thickness of the bonding agent is preferably an average layer thickness perpendicular to the main extension plane of the particular lamination after coating.

The layer thickness refers in particular to the thickness of a single layer on a single side of the particular lamination.

The thickness of the one or more laminations preferably refers to the thickness of exactly one lamination.

According to a preferred embodiment, the first activation is thermal activation in which the bonding agent is heated to a first temperature.

The first temperature during the first activation is preferably approximately 50° C. or more, in particular approximately 60° C. or more.

The first temperature during the first activation is preferably approximately 90° C. or less, in particular approximately 80° C. or less.

It can be advantageous if the bonding agent is heated by means of a heating device during the first activation.

In particular, an infrared heating device, a resistance heating device and/or an induction heating device is used as the heating device.

Additionally or alternatively, a convection heating device and/or a fan heater can be used as the heating device or as part of the heating device.

The first temperature and/or the second temperature is preferably the temperature that is set in a chamber in which the first activation or the second activation is carried out.

After the first activation, the resulting sheet metal laminate is preferably cooled to room temperature (approximately 20° C.) and/or dried by means of a cooling device.

The cooling device is preferably part of an active cooling channel through which the sheet metal laminate is passed.

A pre-consolidation of the plurality of laminations is preferably carried out by means of the first activation.

The sheet metal laminate is a compound lamination, for example.

A thickness of the laminations perpendicular to their main extension plane is preferably approximately 0.35 mm or less.

The thickness of the laminations perpendicular to their main extension plane is preferably approximately 0.3 mm or less, in particular approximately 0.25 mm or less, for example approximately 0.2 mm or less.

The thickness of the laminations perpendicular to their main extension plane is preferably approximately 0.05 mm or more, in particular approximately 0.1 mm or more, for example approximately 0.15 mm or more.

All of the laminations preferably have the same thickness.

"Thickness" preferably means an average thickness.

It can be favorable if the laminations and/or sheet metal laminates are flat and/or planar, in particular parallel and/or perpendicular to their main extension planes.

The laminations and/or sheet metal laminate units are preferably designed without projections and/or without recesses.

For example, what are referred to as "interlocks" are unnecessary.

It can be advantageous if a local thickness variation of the laminations and/or sheet metal laminate units is approximately 5% or less, in particular approximately 2% or less, based on an average thickness of the particular lamination and/or the particular sheet metal laminate unit.

The local thickness variation is preferably independent of openings and/or cut-outs in the laminations.

For a time-efficient procedure, it can be advantageous if the second activation of the bonding agent is carried out during the division of the sheet metal laminate to produce the plurality of sheet metal laminate units and/or during the separating out of the plurality of sheet metal laminate units from the sheet metal laminate.

Additionally or alternatively, the second activation of the bonding agent is carried out after, in particular immediately after, the division of the sheet metal laminate to produce the plurality of sheet metal laminate units and/or the separating out of the plurality of sheet metal laminate units from the sheet metal laminate.

In this case, for example, sheet metal laminate units are assembled, so as to be stacked, in a pressing tool and/or the second activation is carried out inside the pressing tool.

It can be advantageous if the division of the sheet metal laminate to produce the plurality of sheet metal laminate units and/or the separating out of the plurality of sheet metal laminate units from the sheet metal laminate takes place by stamping.

Additionally or alternatively, the sheet metal laminate can be divided and/or the plurality of sheet metal laminate units can be separated out by electromagnetic forming.

For this purpose, a material weakening is preferably introduced into the sheet metal laminate, for example by shear cutting and/or wedge cutting and/or impressing.

Subsequently and/or during this time, the sheet metal laminate is preferably divided by generating an electromagnetic pulse, for example by means of a pulse generator.

The division of the sheet metal laminate and/or the separating out of the plurality of sheet metal laminate units is preferably carried out partially or completely by shear cutting and/or wedge cutting and/or impressing.

Regions of the sheet metal laminate in which the division and/or the separating out takes place can be preheated, in particular locally, before and/or during the division and/or the separating out. The local preheating is preferably carried out using a laser.

A fine blanking tool can be integrated into a pressing tool, for example into a conventional press.

By integrating a fine blanking tool into the pressing tool, in particular high blanking edge qualities can be formed and/or costs can be reduced since, in particular, existing pressing tools can be used.

Preferably optimized cutting edge qualities can be obtained by the, in particular local, preheating. For example, rollover of the divided and/or separated-out sheet metal laminate units is reduced.

Overall, it can be favorable if a low degree of stamping is selected, so that the resulting sheet metal laminate units can be stacked one above the other with the smallest possible air gap.

Due to the lowest possible rollover, the sheet metal laminate units form in particular the largest possible volume in the resulting stack of laminations.

A plurality of sheet metal laminate units and/or a plurality of stacks of laminations can be joined by forming. For example, a plurality of sheet metal laminate units and/or a plurality of stacks of laminations are press-joined and/or clinched.

During and/or after the division of the sheet metal laminate to produce the plurality of sheet metal laminate units and/or the separating out of a plurality of sheet metal laminate units from the sheet metal laminate, the sheet metal laminate units can be joined by forming.

For example, the sheet metal laminate units and/or stacks of laminations are joined by press-joining, for example by clinching.

A stroke of a stamping tool used is preferably 275 mm per stack. "Stack" is to be understood, for example, as a thickness of a sheet metal laminate and/or a height of a stack of sheet metal laminate units and/or a thickness of the stack of laminations.

The thickness of the sheet metal laminate is preferably defined perpendicularly to its main extension plane.

The height of the stack of sheet metal laminate units is preferably defined in parallel with the stacking direction.

The thickness of the stack of laminations is preferably defined perpendicularly to a main extension plane of a lamination.

The stacks of laminations can be stacked in a container, for example a small load carrier, and/or can be transported for further processing.

The second activation of the bonding agent is preferably thermal activation in which the bonding agent is heated to a second temperature.

The second temperature is preferably approximately 120° C. or more, in particular approximately 130° C. or more.

It can be favorable if the second temperature is approximately 250° C. or less, in particular approximately 180° C. or less.

The plurality of sheet metal laminate units is preferably bonded under pressure, in particular in a pressing tool, for example a press.

It can be advantageous if a stamping tool for stamping the sheet metal laminate units is arranged inside the pressing tool and/or is integrated therein.

It can be favorable if the sheet metal laminate units are pressed against one another, in particular over their entire surface, in the stacking direction. This is preferably carried out inside the pressing tool.

In particular after a plurality of stacks of laminations has been stacked, the stacks of laminations can be marked. The marking is carried out in particular by means of a data matrix code and/or by means of laser marking.

Additionally or alternatively, the sheet metal laminate units are marked before they are bonded.

For reproducible implementation of the method, it can be favorable if a quality control of the stack of laminations is carried out.

The object mentioned at the outset is also achieved by a method for producing a stack of laminations, in particular an electrical laminated core, the method preferably comprising the following:
  coating one or more laminations with a bonding agent;
  bonding a plurality of laminations to form a sheet metal laminate by means of a first activation of the bonding agent;
  dividing the sheet metal laminate to produce a plurality of sheet metal laminate units and/or separating out a plurality of sheet metal laminate units from the sheet metal laminate; and
  bonding the plurality of sheet metal laminate units to form a stack of laminations by means of a second activation of the bonding agent.

The bonding agent preferably includes a resin material and an elastomeric material.

The resin material is preferably a synthetic resin material.

Due to the different components of the bonding agent, multi-stage activation and/or bonding of the laminations can preferably take place.

The elastomeric material is preferably used for adhesive bonding. In particular, the resin material is used for cohesive bonding.

It can be advantageous if the elastomeric material bonds and/or reacts during the first activation. The resin material preferably does not bond and/or react during the first activation.

It can be favorable if the resin material bonds and/or reacts during the second activation. The elastomeric material preferably does not bond and/or react during the second activation.

The bonding agent and/or a bonding agent-solvent mixture preferably forms a macroscopically homogeneous mass and/or a macroscopically homogeneous liquid.

A solvent is preferably added to the bonding agent before said agent is deposited on the one or more laminations.

It can be advantageous if a bonding agent-solvent mixture is applied to the one or more laminations.

A bonding agent-solvent mixture is preferably to be understood to mean a mixture of substances, which is in particular homogeneous, consisting of the bonding agent and the solvent. In particular, the bonding agent is substantially completely dissolved and/or dispersed in the solvent.

By coating the one or more laminations with the bonding agent, a surface of the particular lamination is preferably completely covered with the bonding agent.

It can be favorable if the bonding agent contains the elastomeric material in a proportion of approximately 1 vol. % or more, in particular approximately 5 vol. % or more, based on a total volume of the bonding agent or based on a total volume of the bonding agent-solvent mixture.

The proportion of the elastomeric material in the bonding agent is preferably approximately 25 vol. % or less, in particular approximately 20 vol. % or less, based on the total volume of the bonding agent or based on the total volume of the bonding agent-solvent mixture.

It can be favorable if the bonding agent contains the elastomeric material in a proportion of approximately 1 wt. % or more, in particular approximately 5 wt. % or more, based on a total mass of the bonding agent or on a total mass of the bonding agent-solvent mixture.

The proportion of elastomeric material in the bonding agent is preferably approximately 25 wt. % or less, in particular approximately 20 wt. % or less, based on the total mass of the bonding agent or based on the total mass of the bonding agent-solvent mixture.

It can be favorable if the elastomeric material comprises a synthetic rubber material or is formed therefrom.

According to a preferred embodiment, the elastomeric material comprises an acrylonitrile-butadiene rubber or is formed therefrom.

"Acrylonitrile-butadiene rubber" is preferably synonymous with "nitrile-butadiene rubber."

Acrylonitrile-butadiene rubbers have the advantage that they preferably have high resistance to mineral oils, fats and/or hydrocarbons.

In addition or as an alternative to an acrylonitrile-butadiene rubber, the elastomeric material can comprise a styrene-butadiene rubber or be formed therefrom.

The bonding agent is preferably selected such that a Shore A hardness of the bonding agent is lower after the solvent has escaped than after the second activation.

Additionally or alternatively, the Shore A hardness of the bonding agent before the first activation and/or before the solvent escapes is lower than after the second activation.

The Shore hardness is preferably determined according to one of the standards DIN EN ISO 868, DIN ISO 7619-1 and/or ASTM D2240-00. In particular, the Shore A hardness is determined according to DIN 53505.

It can be advantageous if the Shore A hardness of the bonding agent alone and/or the Shore A hardness of the bonding agent-solvent mixture is approximately 20 (Shore A) or more, in particular approximately 30 (Shore A) or more.

It can be advantageous if the Shore A hardness of the bonding agent alone and/or the Shore A hardness of the bonding agent-solvent mixture is approximately 90 (Shore A) or less, in particular approximately 80 (Shore A) or less.

The bonding agent is preferably electrically insulating. In particular, the bonding agent-solvent mixture is electrically insulating.

In particular, the bonding agent is electrically insulating after the first activation. Additionally or alternatively, the bonding agent is electrically insulating after the second activation.

It can be favorable if the resin material comprises an epoxy resin material and/or a thermosetting polymer material or is formed therefrom.

Phenolic resin polymer materials are particularly suitable as thermosetting polymer materials.

It can be advantageous if a phenolic resin polymer material with a formaldehyde/phenol ratio of less than 1:1 is used as the resin material.

Such phenolic resin polymer materials can preferably be obtained by acidic condensation of the starting materials.

For example, the resin material comprises novolak or is formed therefrom. Novolaks are preferably thermoplastic and can be cured by the addition of formaldehyde sources such as hexamethyltetraamine.

It can be advantageous if a proportion of the resin material in the bonding agent is approximately 1 vol. % or more, in particular approximately 2 vol. % or more. The proportion is preferably based on the total volume of the bonding agent or based on the total volume of the bonding agent-solvent mixture.

The proportion of the resin material in the bonding agent is preferably approximately 15 vol. % or less, in particular approximately 10 vol. % or less, based on the total volume of the bonding agent or on the total volume of the bonding agent-solvent mixture.

It can be advantageous if a proportion of the resin material in the bonding agent is approximately 1 wt. % or more, in particular approximately 2 wt. % or more. The proportion is preferably based on the total mass of the bonding agent or based on the total mass of the bonding agent-solvent mixture.

The proportion of the resin material in the bonding agent is preferably approximately 15 wt. % or less, in particular approximately 10 wt. % or less, based on the total mass of the bonding agent or on the total mass of the bonding agent-solvent mixture.

For improved applicability of the bonding agent, it can be favorable, as already mentioned, if a solvent is added to the bonding agent before the one or more laminations are coated.

A proportion of the solvent is preferably approximately 65 vol. % or more, in particular approximately 70 vol. % or more, based on the total volume of the bonding agent-solvent mixture.

The proportion of the solvent is preferably approximately 95 vol. % or less, in particular approximately 90 vol. % or less, based on the total volume of the bonding agent-solvent mixture.

A proportion of the solvent is preferably approximately 65 wt. % or more, in particular approximately 70 wt. % or more, based on the total mass of the bonding agent-solvent mixture.

The proportion of the solvent is preferably approximately 95 wt. % or less, in particular approximately 90 wt. % or less, based on the total mass of the bonding agent-solvent mixture.

It can be advantageous if the bonding agent is substantially free of starting material after the second activation.

A reaction conversion of a cross-linking reaction of the bonding agent after the second activation is preferably approximately 40% or more, in particular approximately 50% or more, for example approximately 60% or more.

The reaction conversion of the cross-linking reaction of the bonding agent after the second activation is preferably approximately 90% or less, in particular approximately 80% or less, for example approximately 70% or less.

The solvent which is added to the bonding agent comprises in particular one or more medium-volatile to high-volatile organic solvents or is formed therefrom.

An evaporation rate of the solvent, determined in particular according to DIN 53170, is preferably approximately 300 or less, in particular approximately 280 or less, for example approximately 250 or less.

It can be advantageous if the evaporation rate of the solvent is approximately 7 or more, in particular approximately 8 or more, for example approximately 10 or more.

The evaporation rate indicates in particular a ratio of a time in which a substance to be tested evaporates completely and a time in which diethyl ether evaporates completely.

According to a preferred embodiment, the solvent comprises a mixture of methoxypropyl acetate and butyl acetate or is formed therefrom.

A volume ratio of methoxypropyl acetate and butyl acetate is preferably 10:1 or less, in particular approximately 8:1 or less, more particularly approximately 6:1 or less.

The volume ratio of methoxypropyl acetate and butyl acetate is preferably approximately 2:1 or more, in particular approximately 3:1 or more, for example approximately 4:1 or more.

For example, methoxypropyl acetate and butyl acetate are mixed in a volume ratio of approximately 1:1.

For optimized adhesion of the bonding agent to the one or more laminations, it can be advantageous if the bonding agent comprises an adhesion promoter.

The adhesion promoter preferably comprises an organically functionalized silane or is formed therefrom. The adhesion promoter preferably comprises an aminosilane or is formed therefrom.

In addition or as an alternative to aminosilanes, epoxysilanes are preferably used as organically functionalized silanes.

The wettability of surfaces of the laminations to be coated can preferably be increased by using the adhesion promoter.

The adhesion promoter in particular promotes formation of chemical bonds between the surfaces of the laminations and components of the bonding agent.

The pre-coating of the plurality of laminations can act as an adhesion promoter.

A proportion of the adhesion promoter is preferably approximately 0.5 vol. % or more, in particular approximately 1 vol. % or more, based on the total volume of the bonding agent or based on the total volume of the bonding agent-solvent mixture.

The proportion of the adhesion promoter is preferably approximately 6 vol. % or less, in particular approximately 5 vol. % or less, based on the total volume of the bonding agent or based on the total volume of the bonding agent-solvent mixture.

The proportion of the adhesion promoter is preferably approximately 0.5 wt. % or more, in particular approximately 1 wt. % or more, based on the total mass of the bonding agent or based on the total mass of the bonding agent-solvent mixture.

The proportion of the adhesion promoter is preferably approximately 6 wt. % or less, in particular approximately 5 wt. % or less, based on the total mass of the bonding agent or based on the total mass of the bonding agent-solvent mixture.

The bonding agent is preferably selected such that an E-modulus of the bonding agent alone and/or an E-modulus of the bonding agent-solvent mixture is approximately 100 $N/mm^2$ or more, in particular approximately 300 $N/mm^2$.

The E-modulus of the bonding agent alone and/or the E-modulus of the bonding agent-solvent mixture is preferably approximately 1000 $N/mm^2$ or less, in particular approximately 800 $N/mm^2$ or less.

The E-moduli given refer preferably to a measurement at approximately 20° C.

It can be advantageous if the bonding agent, in particular in the form of the bonding agent-solvent mixture, is applied to the one or more laminations by means of one or more of the following coating methods: spraying, brushing, and pouring.

A preferred composition of the bonding agent consists of an acrylonitrile-butadiene rubber, novolak and aminosilane. To prepare the bonding agent-solvent mixture, a mixture of methoxypropyl acetate and butyl acetate is preferably added to the bonding agent.

The plurality of sheet metal laminate units preferably have, perpendicularly to their main extension planes, an at least approximately round basic shape.

It can be advantageous if the plurality of sheet metal laminate units each have an at least approximately circular opening in the center. In particular, each opening is concentric with an outer circumference of the particular sheet metal laminate unit in a plan view.

It can be favorable if the plurality of sheet metal laminate units have, toward one edge, a plurality of cut-outs, which are in particular arranged regularly in the circumferential direction. The plurality of cut-outs are, for example, passage openings.

The plurality of cut-outs are preferably arranged annularly.

In particular, the plurality of cut-outs are at least approximately elongate, with their main extension directions each extending in radial directions with respect to a central axis of the particular sheet metal laminate unit. The central axis is preferably a central axis through the centrally arranged opening.

The openings and/or the plurality of cut-outs of the individual sheet metal laminates are preferably arranged substantially congruently in the stack of laminations.

The invention also relates to a stack of laminations, in particular a rotor core and/or a stator core, comprising a plurality of sheet metal laminate units. One or more sheet metal laminate units preferably comprise exactly three laminations, each of which is coated with a bonding agent on both sides. The stack of laminations is produced in particular by a method according to the invention.

One or more of the features and/or advantages mentioned in connection with the method according to the invention preferably apply similarly to the stack of laminations according to the invention.

A thickness of each lamination perpendicular to its main extension plane can be at most approximately 0.35 mm, preferably at most approximately 0.3 mm, in particular at most approximately 0.25 mm, more particularly at most 0.2 mm.

It can be favorable if the laminations of the sheet metal laminate units are flat perpendicular and/or parallel to a main extension plane of at least one lamination.

Additionally or alternatively, the laminations and/or sheet metal laminate units are designed without projections and/or recesses.

What are referred to as "interlocks" for securing against displacement of the laminations and/or sheet metal laminate units in a direction lying in a particular main extension plane of the laminations and/or sheet metal laminate units are preferably unnecessary.

The invention also relates to a machine component, in particular a rotor and/or a stator, comprising one or more stacks of laminations, produced by a method according to the invention and/or comprising one or more stacks of laminations according to the invention.

One or more of the features and/or advantages mentioned in connection with the method according to the invention or the stack of laminations according to the invention preferably apply similarly to the machine component according to the invention.

The invention also relates to an electric motor, comprising a housing, a rotor and a stator, the rotor and/or the stator being machine components according to the invention.

One or more of the features and/or advantages mentioned in connection with the method according to the invention or the stack of laminations according to the invention preferably apply similarly to the electric motor according to the invention.

The electric motor is used in particular in a vehicle, for example a motor vehicle.

The invention also relates to a drive train for a vehicle, in particular for an electric vehicle. The drive train includes an electric motor according to the invention.

One or more of the features and/or advantages mentioned in connection with the method according to the invention or the stack of laminations according to the invention preferably apply similarly to the drive train according to the invention.

The electric motor can comprise an electric motor a transmission or be an electric motor without a transmission.

It can be advantageous if one or more stator cores and/or one or more rotor cores are secured to a housing, for example of an electric motor, by electromagnetic forming.

In particular, the one or more stator cores and/or the one or more rotor cores are pressed onto the housing.

Additionally or alternatively, the housing itself can also be produced by electromagnetic forming.

A layer or a layer system can be arranged between the housing and the one or more rotor cores and/or the one or more stator cores, which layer or layer system comprises at least one ceramic material or is formed therefrom.

The following description and the drawings of embodiments relate to further features and/or advantages of the invention.

BRIEF DESCRIPTION OF THE DRAWINGS

FIG. 4 is a schematic plan view of a stack of laminations which was produced in a method shown in FIGS. 1 to 3.

Identical or functionally equivalent elements are provided with the same reference signs in all figures.

DETAILED DESCRIPTION OF THE DRAWINGS

Figure 1:
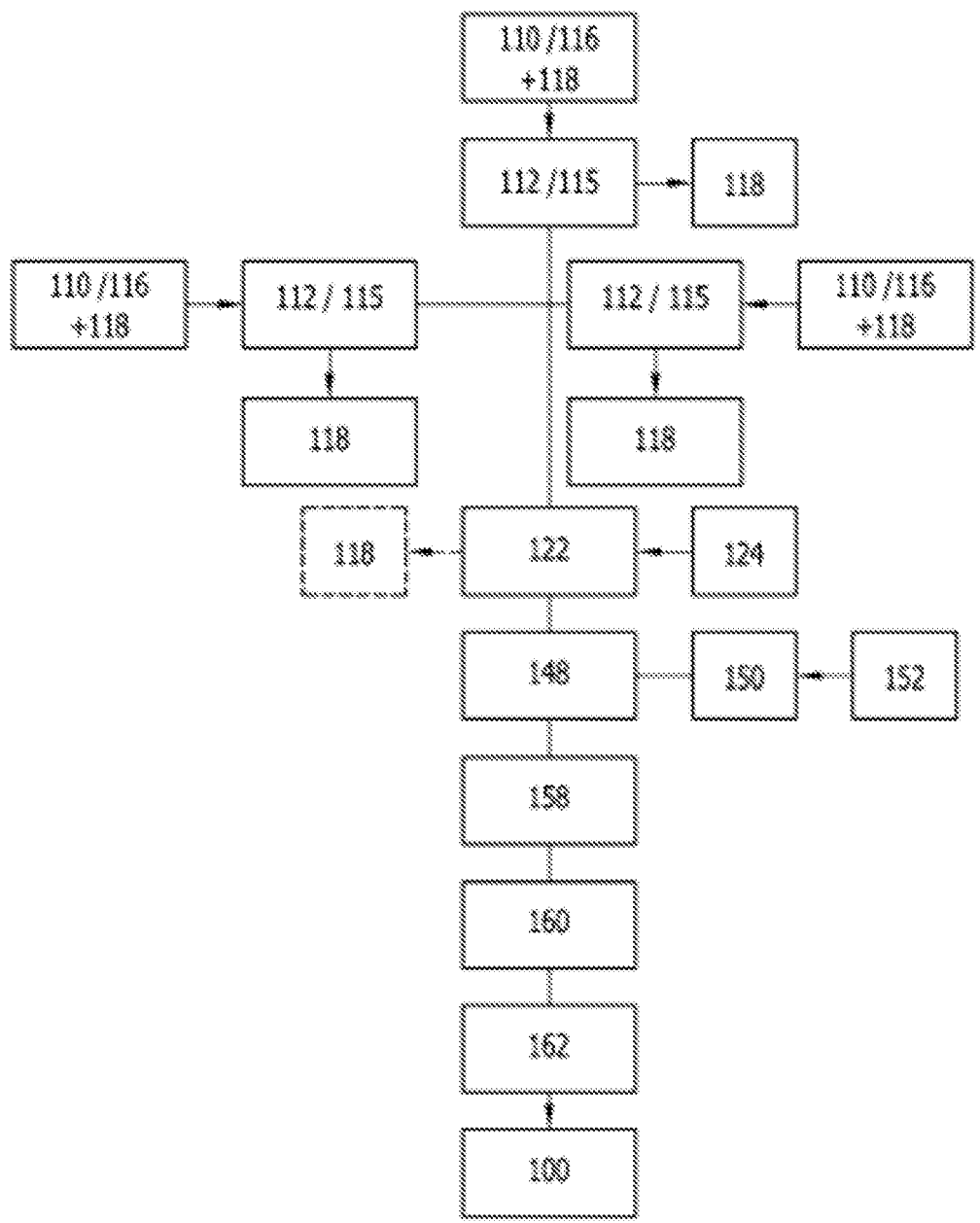
FIG. 1 is a schematic representation of a sequence of a method for producing one or more stacks of laminations, in which method three laminations wound into rolls are integrally bonded together.
Figure 2:
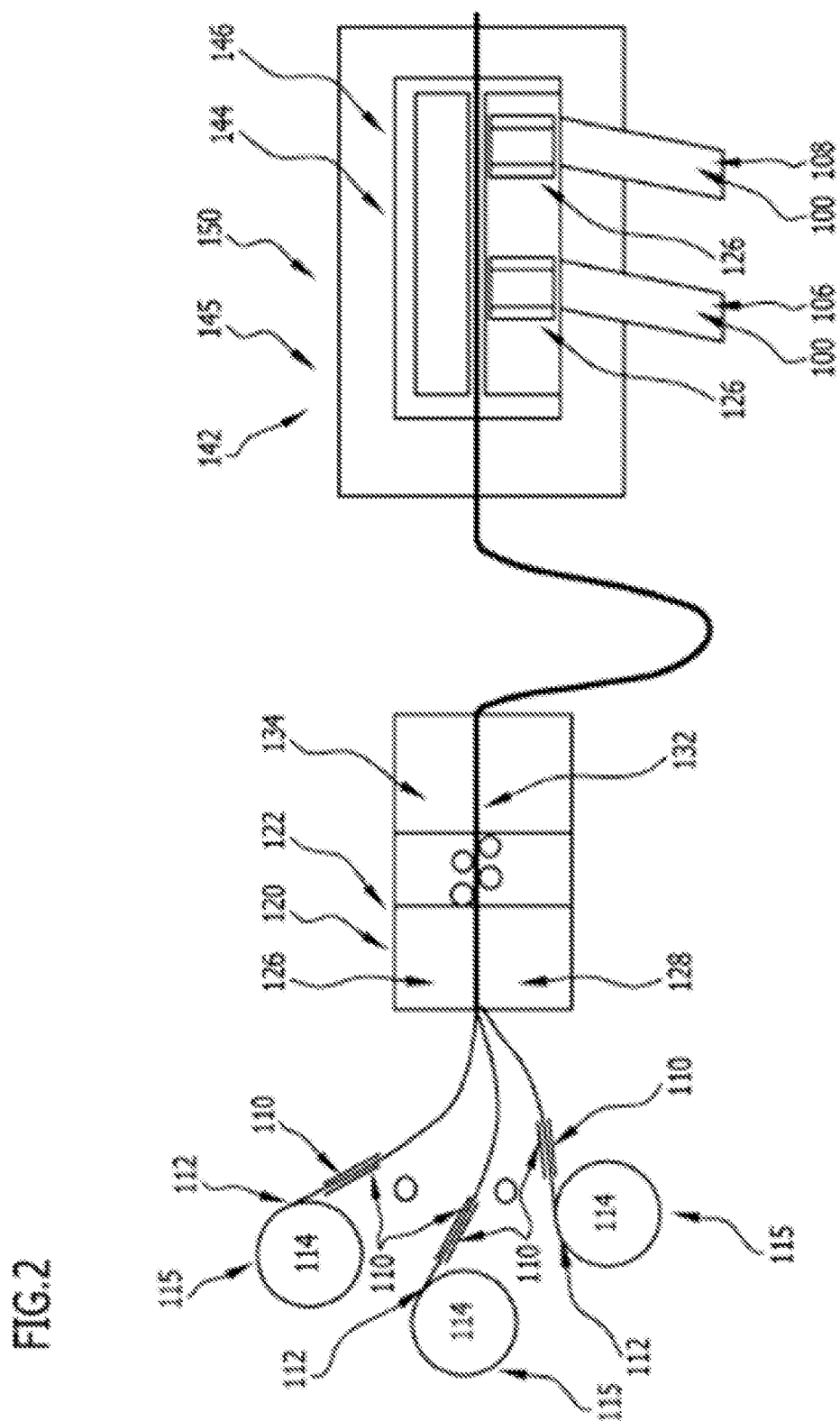
FIG. 2 is a further schematic representation of the method from FIG. 1.
Figure 3:
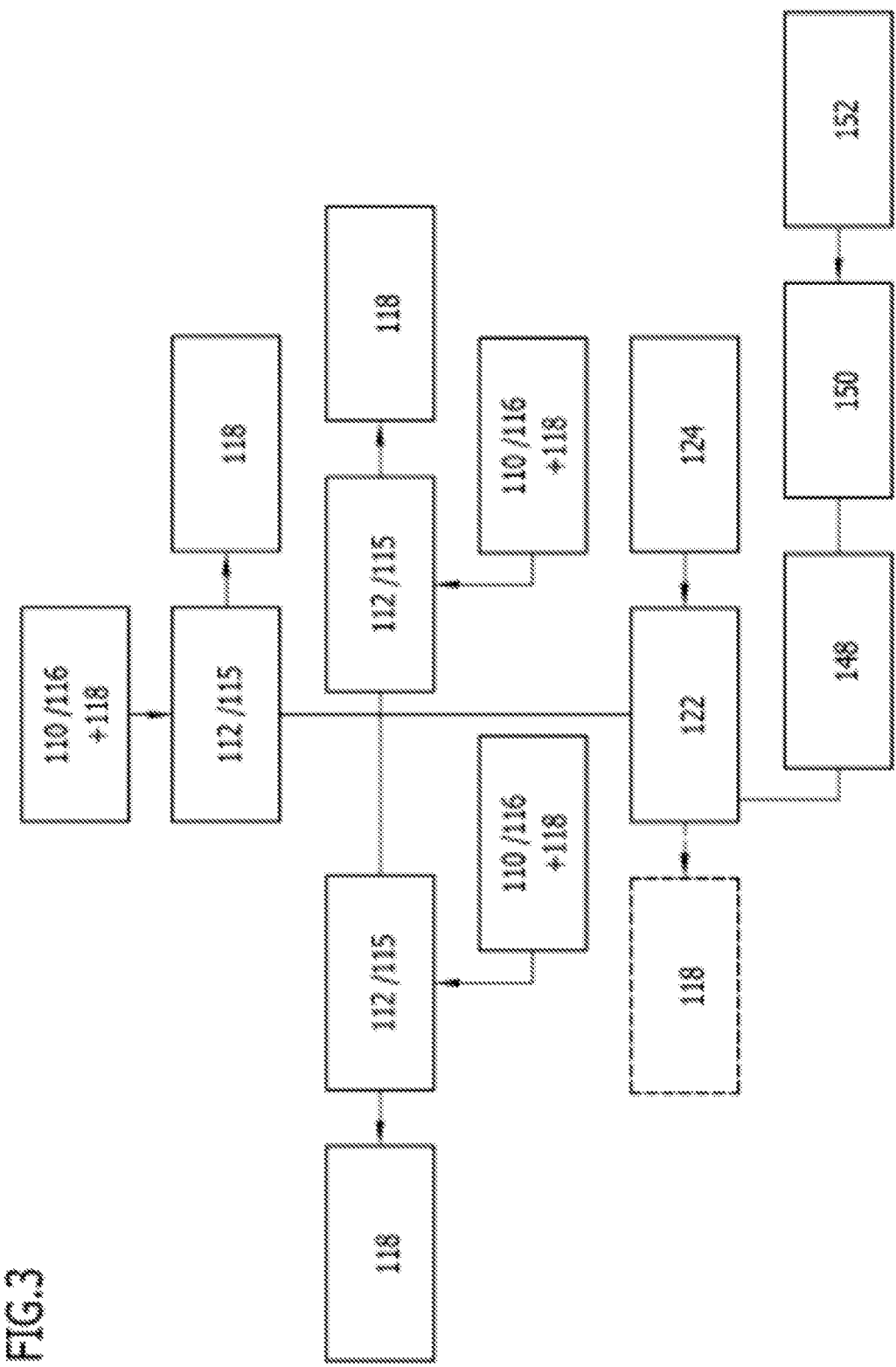
FIG. 3 is a schematic representation of a detail of the method from FIGS. 1 and 2.

A sequence of a method for producing a stack 100 of laminations is shown schematically in FIGS. 1 to 3. Using the method, series production of stacks 100 of laminations can be implemented.

The stacks 100 of laminations are preferably stacks 102 of electrical laminations, for example electrical laminated cores 104. The electrical laminated cores 104 are preferably used in rotors and/or stators (not shown) as rotor cores 106 and/or stator cores 108.

The rotors and/or stators preferably form machine components of an electric motor.

A diameter of a stator is preferably larger than a diameter of a rotor, in particular so that the stator and the rotor can be correspondingly fastened relative to one another. For example, the stator surrounds the rotor in an assembled state.

The electric motor is preferably an electric motor of a vehicle, for example a motor vehicle.

In particular, the electric motor comprises a transmission.

Alternatively, the electric motor can be an electric motor without a transmission.

The electric motor preferably forms part of a drive train of the vehicle.

In a first method step, a bonding agent 110 is preferably deposited on and/or applied to one or more laminations 112.

The laminations 112 form, for example, lamellae in a resulting stack 100 of laminations.

In the present case, three laminations 112 are each provided with a coating of the bonding agent 110 on both sides. In this case, in particular, a layer with a substantially homogeneous thickness is formed perpendicularly to a main extension plane of the particular lamination 112.

The laminations 112 are preferably laminations 112 which comprise metal materials or are formed therefrom.

The laminations 112 are preferably electrical laminations 115. For example, the laminations 112 are made of iron-silicon alloy(s) and/or processed by cold rolling to form a flat material. In particular, the laminations 112 are finally annealed after the cold rolling.

It can be favorable if laminations 112 are used which already have a pre-coating before being coated with the bonding agent 110. The pre-coating is in particular designed to be electrically insulating.

The pre-coating preferably comprises one or more of the following agents or is formed from one or more of the following agents: polyvinyl butyral, polyamide, polyester, modified polyamide, and epoxy.

The pre-coating serves in particular to promote adhesion of the bonding agent 110 to the laminations 112.

For example, the laminations 112 are each coated on both sides with what is referred to as "baking lacquer," which can facilitate mechanical processing in particular.

For series production, it can be advantageous if the laminations 112 are provided in a form in which they are wound into a roll 114. For example, the laminations 112 are provided in the form of coil material.

A width of the rolls 114 and/or coils is preferably in a range of approximately 150 mm to approximately 200 mm for the production of a rotor.

For the production of a stator, the width of the rolls 114 and/or coils is preferably in a range of approximately 300 mm to approximately 350 mm.

The width is defined in particular transversely to a winding direction.

As can be seen in particular in FIG. 2, the laminations 112 are in particular unwound before the laminations 112 are coated with the bonding agent 110. The laminations 112 are preferably coated with the bonding agent 110 on both sides.

The coating with the bonding agent 110 is preferably carried out in an in-line process and/or continuously.

The bonding agent 110 is preferably an adhesive 116 and/or acts like an adhesive 116. The bonding agent 110 is preferably used for the integral bonding of the laminations 112.

The bonding agent 110 to which a solvent 118 has been added can be deposited on the laminations 112, with the solvent 118 being selected in particular such that it escapes after application.

For this purpose, the solvent 118 is selected, for example, such that it has a comparatively high vapor pressure, so that it already evaporates at room temperature and room pressure (approximately 1 bar) and/or at a first activation temperature 124.

It has proven to be advantageous if the solvent 118 comprises one or more medium-volatile to high-volatile organic solvents or is formed therefrom.

The solvent 118 is preferably selected such that both a resin material of the bonding agent 110 and an elastomeric material of the bonding agent are readily soluble therein.

The solvent 118 preferably has an evaporation rate according to DIN 53170 of approximately 300 or less, in particular approximately 280 or less, for example approximately 250 or less.

The solvent 118 preferably has an evaporation rate according to DIN 53170 of approximately 7 or more, in particular approximately 8 or more, for example approximately 10 or more.

The evaporation rate is preferably a ratio of a time in which a substance completely evaporates and a time in which diethyl ether completely evaporates.

For example, the solvent 118 comprises a mixture of methoxypropyl acetate and butyl acetate or is formed therefrom.

A proportion of methoxypropyl acetate is preferably approximately 5 vol. % or more, in particular approximately 50 vol. % or more, for example approximately 75 vol. % or more, based on a total volume of the solvent 118.

Alternatively, the proportion of methoxypropyl acetate in the solvent 118 is preferably approximately 75 vol. % or less, in particular approximately 50 vol. % or less, for example approximately 5 vol. % or less, based on the total volume of the solvent 118.

It can be advantageous if a proportion of the solvent 118 in a bonding agent-solvent mixture is approximately 65 vol. % or more, in particular approximately 70 vol. % or more.

The proportion of the solvent 118 in the bonding agent-solvent mixture is preferably approximately 95 vol. % or less, in particular approximately 90 vol. % or less.

The percentages are preferably based on a total volume of the resulting bonding agent-solvent mixture.

It can be advantageous if a proportion of the solvent 118 in a bonding agent-solvent mixture is approximately 65 wt. % or more, in particular approximately 70 wt. % or more.

The proportion of the solvent 118 in the bonding agent-solvent mixture is preferably approximately 95 wt. % or less, in particular approximately 90 wt. % or less.

The percentages are preferably based on a total mass of the resulting bonding agent-solvent mixture.

The bonding agent 110 is preferably substantially completely dissolved in the solvent 118 and/or distributed homogeneously therein.

Depending on the viscosity of the bonding agent-solvent mixture, it can be favorable if the bonding agent 110 that is mixed with the solvent 118 to form the bonding agent-solvent mixture is applied to the one or more laminations 112 by means of one or more of the following coating methods: spraying, brushing, and pouring.

The bonding agent 110 and/or the solvent 118 are preferably selected such that the bonding agent alone and/or the bonding agent-solvent mixture has a Shore A hardness of approximately 20 (Shore A) or more, in particular approximately 30 (Shore A) or more.

The Shore A hardness of the bonding agent 110 alone and/or the Shore A hardness of the bonding agent-solvent mixture is preferably approximately 90 (Shore A) or less, in particular approximately 80 (Shore A) or less.

For example, the Shore A hardness of the bonding agent 110 after a first activation 122 and/or a second activation 150 and/or before the first activation in the bonding agent-solvent mixture is in a range of approximately 30 (Shore A) to approximately 80 (Shore A).

The bonding agent 110 is preferably selected such that it is electrically insulating after the first activation 122 and/or after the second activation 150.

The mechanical properties mentioned are preferably present in a bonding agent 110 which comprises a resin material and an elastomeric material.

It can be favorable if the elastomeric material comprises a synthetic rubber material or is formed therefrom. For example, the elastomeric material includes an acrylonitrile-butadiene rubber and/or a styrene-butadiene rubber.

According to a preferred embodiment, the elastomeric material is an acrylonitrile-butadiene rubber.

A proportion of the elastomer material, in particular the acrylonitrile-butadiene rubber, is preferably approximately 1 vol. % or more, in particular approximately 5 vol. % or more, based on a total volume of the bonding agent 110 or based on the total volume of the bonding agent-solvent mixture.

The proportion of the elastomer material, in particular the acrylonitrile-butadiene rubber, is preferably approximately 25 vol. % or less, in particular approximately 20 vol. % or less, based on the total volume of the bonding agent 110 or based on the total volume of the bonding agent-solvent mixture.

A proportion of the elastomer material, in particular the acrylonitrile-butadiene rubber, is preferably approximately 1 wt. % or more, in particular approximately 5 wt. % or more, based on a total mass of the bonding agent 110 or based on the total mass of the bonding agent-solvent mixture.

The proportion of the elastomer material, in particular the acrylonitrile-butadiene rubber, is preferably approximately 25 wt. % or less, in particular approximately 20 wt. % or less, based on the total mass of the bonding agent 110 or based on the total mass of the bonding agent-solvent mixture.

For the second activation 150 at a second temperature 152 that is increased compared with a first temperature 124 in the first activation 122, it can be advantageous if the bonding agent 110 comprises a resin material.

A proportion of the resin material in the binder 110 is preferably approximately 1 vol. % or more, in particular approximately 2 vol. % or more, based on the total volume of the binder 110 or based on the total volume of the bonding agent-solvent mixture.

The proportion of the resin material in the bonding agent 110 is preferably approximately 15 vol. % or less, in particular approximately 10 vol. % or less, based on the total volume of the bonding agent 110 or based on the total volume of the bonding agent-solvent mixture.

A proportion of the resin material in the bonding agent 110 is preferably approximately 1 wt. % or more, in particular approximately 2 wt. % or more, based on the total mass of the bonding agent 110 or based on the total mass of the bonding agent-solvent mixture.

The proportion of the resin material in the binder 110 is preferably approximately 15 wt. % or less, in particular approximately 10 wt. % or less, based on the total mass of the bonding agent 110 or based on the total mass of the bonding agent-solvent mixture.

An epoxy resin material and/or a thermosetting polymer material have proven to be particularly preferred resin materials.

It can be favorable if the bonding agent 110 comprises a phenolic resin polymer material, in particular a novolak, as the resin material, or is formed therefrom.

Novolaks are preferably phenolic resins having a formaldehyde to phenol ratio of less than 1:1.

For improved adhesion of the bonding agent 110 to the laminations 112, it can be advantageous if the bonding agent 110 comprises an adhesion promoter.

The adhesion promoter preferably comprises an organically functionalized silane, in particular an aminosilane, or is formed from an organically functionalized silane, in particular an aminosilane.

As an alternative or in addition to aminosilanes, epoxysilanes can also be used as organically functionalized silanes.

It can be advantageous if a proportion of the adhesion promoter is approximately 0.5 vol. % or more, in particular approximately 1 vol. % or more, based on the total volume of the bonding agent 110 or based on the total volume of the bonding agent-solvent mixture.

The proportion of the adhesion promoter is preferably approximately 6 vol. % or less, in particular approximately 5 vol. % or less, based on the total volume of the bonding agent 110 or based on the total volume of the bonding agent-solvent mixture.

It can be advantageous if the proportion of the adhesion promoter is approximately 0.5 wt. % or more, in particular approximately 1 wt. % or more, based on the total mass of the bonding agent 110 or based on the total mass of the bonding agent-solvent mixture.

The proportion of the adhesion promoter is preferably approximately 6 wt. % or less, in particular approximately 5 wt. % or less, based on the total mass of the bonding agent 110 or based on the total mass of the bonding agent-solvent mixture.

An E-modulus of the bonding agent 110 and/or an E-modulus of the bonding agent-solvent mixture is preferably approximately 100 N/mm$^2$ or more, in particular approximately 300 N/mm$^2$ or more.

The E-modulus of the bonding agent 110 and/or the bonding agent-solvent mixture is preferably approximately 1000 N/mm$^2$ or less, in particular approximately 800 N/mm$^2$ or less.

A particularly preferred composition of the bonding agent-solvent mixture consists substantially of a mixture of acrylonitrile-butadiene rubber, novolak, aminosilane and, as the solvent, a mixture of methoxypropyl acetate and butyl acetate.

After the laminations 112 have been coated with the bonding agent 110, the laminations 112 are preferably brought together and/or arranged one above the other such that in particular main extension planes of the laminations 112 are arranged at least approximately in parallel with one another.

In embodiments in which the laminations 112 are electrical laminations 115, it can be advantageous if the electrical laminations 115 are preferably arranged one above the other such that a main grain orientation direction of different electrical laminations 115 varies in a stacking direction.

For example, main grain orientation directions of electrical laminations 115 arranged one above the other in the stacking direction enclose an angle of approximately 30° or more, in particular approximately 50° or more, with one another.

Main grain orientation directions of electrical laminations 115 arranged one above the other in the stacking direction enclose in particular an angle of approximately 120° or less, in particular approximately 100° or less, with one another.

For example, electrical laminations 115 arranged one above the other in the stacking direction are arranged alternately longitudinally and transversely with respect to their main grain orientation directions. In this way, a press chamber in which the electrical laminations are pressed together and/or pressed against one another, preferably after coating, can be optimally utilized.

A thickness of the coating of the bonding agent 110 is preferably selected such that a ratio of the thickness of the laminations 112 perpendicular to their main extension plane and a layer thickness of the bonding agent 110 perpendicular to the main extension plane of the laminations 112 after and/or before the escape of the solvent 118 is approximately 20:1 or more, in particular approximately 25:1 or more.

The ratio of the thickness of the laminations 112 and the layer thickness of the bonding agent 110 is preferably approximately 250:1 or less, in particular approximately 220:1 or less.

For example, a ratio of the thickness of a lamination 112 to the layer thickness of a layer of the bonding agent 110 is in a range of approximately 200:1 and approximately 28.55:1.

It can be advantageous if the thickness of the laminations 112 is approximately 0.2 mm and a layer thickness of the bonding agent 110 is approximately 1 μm or approximately 7 μm.

For example, laminations 112 having a thickness perpendicular to their main extension plane of preferably 0.5 mm or less, in particular approximately 0.35 mm or less, are used.

The thickness of the laminations 112 is preferably approximately 0.05 mm or more, in particular approximately 0.15 mm or more.

The layer thickness of the bonding agent 110 after the application and/or after the first activation 122 is preferably approximately 1 μm or more, in particular approximately 3 μm or more, for example approximately 5 μm or more.

After the application and/or after the first activation 122, the layer thickness of the bonding agent 110 is preferably approximately 9 μm or less, in particular approximately 8 μm or less, for example approximately 7 μm or less.

For example, the layer thickness of the bonding agent 110 is approximately 6 μm on average on one side of the particular lamination 112 and/or taken together on both sides of the particular lamination 112.

The sheet metal laminate units 140 and/or laminations 112 are preferably formed without what are referred to as "interlocks." The "interlocks" are in particular arranged perpendicularly to and/or in parallel with a main extension plane of a lamination.

In particular, the laminations 112 and/or the sheet metal laminate units 140 do not have any projections and/or recesses, in particular perpendicular and/or parallel to a particular main extension plane. Exceptions to this are, in particular, openings and/or cut-outs in the laminations 112 for forming a rotor shape and/or stator shape.

It can be favorable if a local thickness variation of the laminations 112 and/or sheet metal laminate units 140 is approximately 5% or less, in particular approximately 2% or less, based on an average thickness of the particular lamination 112 and/or the particular sheet metal laminate unit 140.

The local thickness variation is preferably independent of openings and/or cut-outs in the laminations 112 and/or sheet metal laminate units 140.

For example, the laminations 112 and/or sheet metal laminates 140 are flat.

The laminations 112 coated with the bonding agent 110, in particular on both sides, are preferably arranged and/or stacked one above the other such that, between the central lamination 112 in the stacking direction and the two outer laminations 112, two layers of the bonding agent 110 directly adjoin and/or are bonded together.

It can be favorable if the laminations 112 arranged one above the other and coated with the bonding agent 110 are fed to a reaction chamber 120 in which the first activation 122 of the bonding agent 110 is carried out.

The first activation 122 preferably takes place in-line and/or while the laminations 112 are being guided through the reaction chamber 120.

It can be favorable if the first activation 122 is thermal activation in which the bonding agent 110 and/or the laminations 112 are heated to a first temperature 124.

For example, the laminations 112 arranged one above the other and coated with the bonding agent 110 are passed through a heating device 126. The heating device preferably heats the bonding agent 110 and/or the laminations 112 to the first temperature 124.

An infrared heating device 128, for example an infrared radiator, is in particular suitable as the heating device 126.

Alternatively or additionally, resistance heating devices and/or induction heating devices can also be used to heat the bonding agent 110 and/or the laminations 112.

Additionally or alternatively, a convection heating device and/or a fan heater can be used as the heating device 126 or as part of the heating device 126.

The first activation 122 is preferably carried out at a temperature of 50° C. or more, in particular 55° C. or more.

The first temperature 124 during the first activation 122 is preferably approximately 90° C. or less, in particular approximately 85° C. or less.

During the first activation 122, bonding between adjoining layers of the bonding agent 110 preferably takes place. The bonding is based in particular predominantly on adhesion forces.

This first activation 122 at the first temperature 124 preferably leads to an integral bond of the layers of the bonding agent 110 between the laminations 112. The bonding takes place in particular as a result of a chemical and/or physical reaction of an elastomeric material of the bonding agent 110.

During the first activation 122 it can be advantageous if the heated laminations 112 coated with the bonding agent 110 are pressed together.

The pressing together can be carried out, for example, by guiding the laminations 112 between rolls (cf. FIG. 2). In particular, the rolls generate an at least approximately constant contact pressure between the individual laminations 112.

The first activation 122 preferably produces a sheet metal laminate 132 which comprises the—in this case three—laminations 112 which are integrally bonded together by means of the bonding agent 110.

As an alternative or in addition to thermal activation, the first activation 122 can also be activation by pressure and/or chemical activation.

In the case of activation by pressure, the reaction chamber 120 in which the first activation 122 is carried out can be subjected to a positive pressure or a negative pressure.

Additionally or alternatively, the laminations 112 to be bonded can be pressed together, for example as described above.

In the case of chemical activation, the bonding agent 110 is preferably brought into contact with a reaction starting substance, and/or a reaction starting substance is added at the time of the first activation 122.

A reaction starting substance is, for example, a cross-linking agent and/or a radical initiator.

A pre-consolidation preferably takes place as a result of the first activation 122.

After the laminations 112 have been integrally bonded to form the sheet metal laminate 132, the sheet metal laminate 132 is preferably passed through a cooling device 134.

The cooling device 134 can be in the form of an active cooling channel, which serves to dry and/or cool the sheet metal laminate 132 to room temperature (approximately 20° C.).

During drying, any remaining solvent 118 preferably evaporates substantially completely (indicated by dashed lines in FIGS. 1 and 3).

The sheet metal laminate 132 can be wound, in particular after it has been passed through the cooling device 134.

Before a method step following the production of the sheet metal laminate 132, the sheet metal laminate 132, if it is wound, is preferably unwound again.

After the sheet metal laminate 132 has been produced, the sheet metal laminate 132 is preferably divided to produce a plurality of sheet metal laminate units 140, and/or a plurality of sheet metal laminate units 140 are separated out from the sheet metal laminate 132.

For this purpose, the sheet metal laminate 132 is preferably fed to a tool 142 which comprises a stamping tool 144.

The stamping tool 144 preferably comprises two tool halves, each of which is equipped with one or more cutter elements (not shown). By pressing the two tool halves of the stamping tool 144 together, a predetermined shape is separated out and/or cut out of the sheet metal laminate 132, preferably by means of the cutter elements.

For minimized rollover, it can be advantageous if the sheet metal laminate 132 is preheated, in particular before stamping.

For example, a region of the sheet metal laminate 132 in which one or more cutter elements of the stamping tool 144 cut is preheated. This region is a cut edge area, for example.

The preheating is preferably carried out by means of a laser.

For an optimized procedure it can be advantageous if the stamping tool 144 is integrated into a pressing tool 145, for example a press.

The pressing tool 145 is preferably used to press a plurality of sheet metal laminate units 140 together during a second activation 150 of the bonding agent 110.

A fine blanking tool 146 is preferably used as the stamping tool 144. For example, a fine blanking unit from Webo Werkzeugbau Oberschwaben GmbH is integrated into a conventional press.

Stamping is indicated schematically in FIGS. 1 and 3 with the reference sign 148.

The sheet metal laminate 132 can be completely divided by the stamping 148, or the material can be first weakened by the stamping tool 144 and the sheet metal laminate 132 can subsequently and/or in the process be completely divided by an electromagnetic pulse.

The electromagnetic pulse is generated, for example, by an electromagnetic pulse generator. According to this alternative of the method, the sheet metal laminate 132 is formed electromagnetically.

It can be favorable if the stamping tool 144 has one stroke per stack of approximately 200 mm to approximately 350 mm, in particular of approximately 250 mm to approximately 300 mm, for example approximately 275 mm. A "stack" refers in particular to a thickness of a sheet metal laminate 132 and/or a height of a stack of sheet metal laminate units 140 and/or a thickness of the stack 100 of laminations.

The thickness of the sheet metal laminate 132 is preferably defined perpendicularly to its main extension plane.

The height of the stack of sheet metal laminate units 140 is preferably defined in parallel with the stacking direction.

The thickness of the stack 100 of laminations is preferably defined perpendicularly to a main extension plane of a lamination 112.

The sheet metal laminate units 140 can be press-joined in the tool 142 before, during and/or after the second activation 150. For example, the sheet metal laminate units 140 are clinched.

Additionally or alternatively, stacks 100 of laminations are clinched.

A plurality of sheet metal laminate units 140 is preferably stacked immediately after the sheet metal laminate units 140 have been divided and/or separated out.

After the stacking, the sheet metal laminate units 140 are preferably integrally bonded together.

It can be favorable if the plurality of sheet metal laminate units 140 is integrally bonded while still in the tool 142, in particular the pressing tool 145.

In order to integrally bond a plurality of sheet metal laminate units 140, the sheet metal laminate units 140 are preferably stacked one above the other, so that main extension planes of the laminations 112 of the sheet metal laminate units 140 are arranged substantially in parallel with one another.

As already described in connection with arranging and/or stacking the laminations 112 one above the other before the first activation 122, sheet metal laminate units 140 comprising electrical laminations 115 are arranged such that their main grain orientation directions are arranged so as to be offset from one another and/or not parallel and/or skewed.

The sheet metal laminate units 140 are preferably integrally bonded by means of the second activation 150 of the bonding agent 110. The second activation 150 is preferably thermal activation at a second temperature 152, which is in particular approximately 30° C. or more, for example approximately 50° C. or more, and which is higher than the first temperature 124 during the first activation 122.

In the second activation 150, the stacks of sheet metal laminate units 140 are preferably heated by one or more heating devices 126.

For example, the bonding agent 110 is heated to a temperature of approximately 120° C. or more, in particular approximately 130° C. or more.

During the second activation 150, in particular bonding due to cohesive forces between layers of the bonding agent 110 arranged on the outsides of the sheet metal laminate units 140 takes place.

A cross-linking reaction of a resin-based portion of the bonding agent 110 preferably takes place during the second activation 150. The second activation 150 is also colloquially referred to as "baking."

In addition or as an alternative to thermal activation, the second activation 150 can be activation by pressure and/or chemical activation. With regard to the activation by pressure and the chemical activation, reference is made to the explanations in connection with the first activation 122.

In the present case, the integral bonding of a plurality of sheet metal laminate units 140 results in stacks 100 of laminations.

For efficient further processing, it can be favorable if the stacks 100 of laminations are stacked, in particular after they have been removed from the tool 142, and are stored and/or transported further in containers, for example small load carriers.

The stacking of the stacks 100 of laminations is indicated schematically in FIG. 1 by the reference sign 158.

It can be favorable if the stack 100 of laminations is marked (denoted by reference sign 160). For example, data matrix codes are used for marking 160. The marking 160 is made, for example, by laser marking.

Additionally or alternatively, sheet metal laminate units 140 can be already marked.

A marking 160 can be made for each three stacks of stacks 100 of laminations.

Before the stacks 100 of laminations that have been produced are delivered, a quality control 162 is preferably carried out.

In FIG. 4, a stack 100 of laminations is shown in a plan view.

The stack 100 of laminations preferably has a substantially round shape in plan view and/or comprises a centrally arranged opening 154.

It can be favorable if the stack 100 of laminations has annularly arranged cut-outs 156 in the form of passage openings.

It can be advantageous if each sheet metal laminate 132 has substantially the same shape. The openings 154 and/or cut-outs 156 of all sheet metal laminate units 140 of a stack 100 of laminations are preferably arranged substantially congruently in the stack 100 of laminations.

To produce an electric motor, it can be favorable if a housing of the electric motor is pressed onto one or more rotor cores 106 and/or one or more stator cores 108 by means of electromagnetic forming.

In this way, the one or more rotor cores 106 and/or the one or more stator cores 108 can be placed almost hydrostatically against the housing.

By hydrostatic forming of the housing, parts produced by means of sheet metal forming can form part of the housing, or the housing can be made entirely of a sheet metal material.

The housing can be a semi-finished product that is rolled and/or joined, for example welded, at butt ends. Preferred semi-finished products are pipes.

In this way, material costs and/or tool costs can be saved. Furthermore, housings can be produced with a constant material thickness profile.

Even contact between the housing and the one or more rotor cores 106 and/or the one or more stator cores 108 and/or improved electrical insulation can increase the efficiency of the electric motor.

A layer or a layer system is preferably arranged between the housing and the one or more rotor cores 106 and/or the one or more stator cores 108, which layer or layer system comprises at least one ceramic material or is formed therefrom.

The layer and/or the layer system is preferably thermally conductive and/or electrically insulating.

In the above-described method for producing a stack 100 of laminations, bonding at two temperature levels is preferably achieved through the use of a bonding agent comprising an elastomer material and a resin material, so that in particular two-stage bonding can be carried out with only one bonding agent 110.

An integral bonding effect of the bonding agent 110 between the laminations 112 achieved in a first stage is preferably retained during the second activation 150, in which a plurality of sheet metal laminate units 140 were integrally bonded together.

Preferred embodiments are as follows:

1. Method for producing a stack (100) of laminations, in particular an electrical laminated core (104), the method comprising the following:
   coating one or more laminations (112) with a bonding agent (110);
   bonding a plurality of laminations (112) to form a sheet metal laminate (132) by means of a first activation (122) of the bonding agent (110);
   dividing the sheet metal laminate (132) to produce a plurality of sheet metal laminate units (140) and/or separating out a plurality of sheet metal laminate units (140) from the sheet metal laminate (132); and
   bonding the plurality of sheet metal laminate units (140) to form a stack (100) of laminations by means of a second activation (150) of the bonding agent (110).
2. Method according to embodiment 1, characterized in that one or more parameters in the first activation (122) and the second activation (150) differ from one another.
3. Method according to either embodiment 1 or embodiment 2, characterized in that the first activation (122) and/or the second activation (150) are thermal activation.
4. Method according to any of embodiments 1 to 3, characterized in that the plurality of laminations (112) which are bonded together is provided in a wound form and/or in that the one or more laminations (112) are unwound for coating with the bonding agent (110).
5. Method according to any of embodiments 1 to 4, characterized in that before and/or after the division of the sheet metal laminate (132), a plurality of sheet metal laminate units (140) are stacked one on top of the other in a stacking direction, such that in particular a stack of sheet metal laminate units (140) is produced.
6. Method according to any of embodiments 1 to 5, characterized in that the plurality of laminations (112) is provided in a pre-coated form, in particular pre-coated on both sides.
7. Method according to any of embodiments 1 to 6, characterized in that the one or more laminations (112) are each coated with the bonding agent (110) on both sides.
8. Method according to any of embodiments 1 to 7, characterized in that a ratio between a thickness of the one or more laminations (112) and a layer thickness of the bonding agent (110) is in a range of approximately 20:1 to approximately 250:1, in particular of approximately 25:1 to approximately 210:1.
9. Method according to any of embodiments 1 to 8, characterized in that the first activation (122) is thermal activation in which the bonding agent (110) is heated to a first temperature (124), the first temperature (124) during the first activation (122) being in a range of approximately 50° C. to approximately 90° C., in particular of approximately 60° C. to approximately 80° C., the bonding agent (110) being heated during the first activation (122) in particular by means of a heating device (126), in particular by means of an infrared heating device (128).
10. Method according to any of embodiments 1 to 9, characterized in that the second activation (150) of the bonding agent (110) takes place during and/or after the division of the sheet metal laminate (132) to produce the plurality of sheet metal laminate units (140) and/or the separating out of the plurality of sheet metal laminate units (140) from the sheet metal laminate (132).
11. Method according to any of embodiments 1 to 10, characterized in that the division of the sheet metal laminate (132) to produce the plurality of sheet metal laminate units (140) and/or the separating out of the plurality of sheet metal laminate units (140) from the sheet metal laminate (132) takes place by stamping (148).
12. Method according to any of embodiments 1 to 11, characterized in that a plurality of sheet metal laminate units (140) and/or a plurality of stacks (100) of laminations are joined, in particular clinched, by forming.
13. Method according to any of embodiments 1 to 12, characterized in that the second activation (150) of the bonding agent (110) is thermal activation in which the bonding agent (110) is heated to a second temperature (152), the second temperature (152) being approximately 120° C. or more, in particular approximately 130° C. or more.
14. Method according to any of embodiments 1 to 13, characterized in that, in particular after stacking (158) a plurality of stacks (100) of laminations, the stacks (100) of laminations are marked, the marking being carried out in particular by means of a data matrix code and/or by means of laser marking.
15. Method according to any of embodiments 1 to 14, characterized in that the bonding agent (110) comprises a resin material and an elastomeric material.
16. Method according to any of embodiments 1 to 15, characterized in that a proportion of the elastomeric material is in a range of approximately 1 vol. % to approximately 25 vol. %, in particular of approximately 5 vol. % to approximately 20 vol. %, based on a total volume of the bonding agent (110) or based on a total volume of a bonding agent-solvent mixture.
17. Method according to any of embodiments 1 to 16, characterized in that the elastomeric material comprises a synthetic rubber material, in particular an acrylonitrile-butadiene rubber, or is formed therefrom.
18. Method according to any of embodiments 1 to 17, characterized in that a Shore A hardness of the bonding agent (110) and/or a Shore A hardness of a bonding agent-solvent mixture is in a range of approximately 20 to approximately 90, in particular of approximately 30 to approximately 80.
19. Method according to any of embodiments 1 to 18, characterized in that the bonding agent (110), in particular after the first activation (122) and/or the second activation (150), is electrically insulating.
20. Method according to any of embodiments 1 to 19, characterized in that the resin material comprises an epoxy resin material and/or a thermosetting polymer material, in particular a phenolic resin polymer material, in particular a novolak, or is formed therefrom.
21. Method according to any of embodiments 1 to 20, characterized in that a proportion of the resin material in the bonding agent (110) is in a range of approximately 1 vol. % to approximately 15 vol. %, in particular of approximately 2 vol. % to approximately 10 vol. %, based on a total volume of the bonding agent (110) or on a total volume of a bonding agent-solvent mixture.

22. Method according to any of embodiments 1 to 21, characterized in that a solvent (118) is added to the bonding agent (110) before the coating of the one or more laminations (112), a proportion of the solvent (118) being in a range of approximately 65 vol. % to approximately 95 vol. %, in particular of approximately 70 vol. % to approximately 90 vol. %, based on a total volume of a resulting bonding agent-solvent mixture.

23. Method according to any of embodiments 1 to 22, characterized in that a solvent (118) is added to the bonding agent (110) before the coating of the one or more laminations (112), the solvent (118) comprising one or more medium-volatile to high-volatile organic solvents or being formed therefrom.

24. Method according to any of embodiments 1 to 23, characterized in that a solvent (118) is added to the bonding agent (110) before the coating of the one or more laminations (112), the solvent (118) comprising in particular a mixture of methoxypropyl acetate and butyl acetate or being formed therefrom.

25. Method according to any of embodiments 1 to 24, characterized in that the bonding agent (110) comprises an adhesion promoter, the adhesion promoter comprising in particular an organically functionalized silane, in particular an aminosilane, or being formed therefrom.

26. Method according to any of embodiments 1 to 25, characterized in that the bonding agent (110) comprises an adhesion promoter, a proportion of the adhesion promoter being in a range of approximately 0.5 vol. % to approximately 6 vol. %, in particular of approximately 1 vol. % to approximately 5 vol. %, based on a total volume of the bonding agent (110) or based on a total volume of a bonding agent-solvent mixture.

27. Method according to any of embodiments 1 to 26, characterized in that an E-modulus of the bonding agent (110) and/or an E-modulus of a bonding agent-solvent mixture is in a range of approximately 100 N/mm² to approximately 1000 N/mm², in particular of approximately 300 N/mm² to approximately 800 N/mm².

28. Method according to any of embodiments 1 to 27, characterized in that the bonding agent (110), in particular in a bonding agent-solvent mixture, is applied to the one or more laminations (112) by means of one or more of the following coating methods: spraying, brushing, and pouring.

29. Stack (100) of laminations, in particular a rotor core (106) and/or a stator core (108), comprising a plurality of sheet metal laminate units (140), wherein one or more sheet metal laminate units (140) comprise exactly three laminations (112), each of which is coated with a bonding agent (110) on both sides, wherein the stack (100) of laminations is produced in particular by a method according to any of embodiments 1 to 28.

30. Stack (100) of laminations according to embodiment 29, characterized in that a thickness of each lamination (112) perpendicular to its main extension plane is at most approximately 0.35 mm, in particular at most approximately 0.3 mm, in particular at most approximately 0.25 mm, in particular at most approximately 0.2 mm.

31. Stack (100) of laminations according to either embodiment 29 or embodiment 30, characterized in that the laminations (112) of the sheet metal laminate units (140) are flat and/or free of projections and/or recesses perpendicularly to and/or in parallel with a main extension plane of at least one lamination (112).

32. Machine component, in particular a rotor and/or a stator, comprising one or more stacks (100) of laminations, produced by a method according to any of embodiments 1 to 28 and/or comprising one or more stacks (100) of laminations according to any of embodiments 29 to 31.

33. Electric motor comprising a housing, a rotor, and a stator, wherein the rotor and/or the stator are machine components according to embodiment 32.

34. Drive train for a vehicle, comprising an electric motor according to embodiment 33.

The invention claimed is:

1. Method for producing a stack of lamination, the method comprising the following:
    coating one or more laminations with a bonding agent;
    bonding a plurality of laminations to form a sheet metal laminate by means of a first activation of the bonding agent;
    dividing the sheet metal laminate to produce a plurality of sheet metal laminate units and/or separating out a plurality of sheet metal laminate units from the sheet metal laminate; and
    bonding the plurality of sheet metal laminate units to form a stack of laminations by means of a second activation of the bonding agent,
    wherein one or more parameters in the first activation and the second activation differ from one another.

2. Method according to claim 1, wherein the first activation and/or the second activation are thermal activation.

3. Method according to claim 1, wherein the plurality of laminations which are bonded together is provided in a wound form and/or wherein the one or more laminations are unwound for coating with the bonding agent.

4. Method according to claim 1, wherein before and/or after the division of the sheet metal laminate, a plurality of sheet metal laminate units are stacked one on top of the other in a stacking direction, such that in particular a stack of sheet metal laminate units is produced.

5. Method according to claim 1, wherein the plurality of laminations is provided in a pre-coated form.

6. Method according to claim 1, wherein the one or more laminations are each coated with the bonding agent on both sides.

7. Method according to claim 1, wherein a ratio between a thickness of the one or more laminations and a layer thickness of the bonding agent is in a range of approximately 20:1 to approximately 250:1.

8. Method according to claim 1, wherein the first activation is thermal activation in which the bonding agent is heated to a first temperature, the first temperature during the first activation being in a range of approximately 50° C. to approximately 90° C., the bonding agent being heated during the first activation by means of a heating device or by means of an infrared heating device.

9. Method according to claim 1, wherein the second activation of the bonding agent takes place during and/or after the division of the sheet metal laminate to produce the plurality of sheet metal laminate units and/or the separating out of the plurality of sheet metal laminate units from the sheet metal laminate.

10. Method according to claim 1, wherein the division of the sheet metal laminate to produce the plurality of sheet metal laminate units and/or the separating out of the plurality of sheet metal laminate units from the sheet metal laminate takes place by stamping.

11. Method according to claim 1, wherein a plurality of sheet metal laminate units and/or a plurality of stacks of laminations are joined.

12. Method according to claim 1, wherein the second activation of the bonding agent is thermal activation in which the bonding agent is heated to a second temperature, the second temperature being approximately 120° C. or more.

13. Method according to claim 1, wherein, after stacking a plurality of stacks of laminations, the stacks of laminations are marked.

14. Stack of laminations, a rotor core, and/or a stator core, comprising a plurality of sheet metal laminate units, wherein one or more sheet metal laminate units comprise exactly three laminations, each of which is coated with a bonding agent on both sides, wherein the stack of laminations is produced by a method according to claim 1.

15. Stack of laminations according to claim 14, wherein a thickness of each lamination perpendicular to its main extension plane is at most approximately 0.35 mm.

16. Stack of laminations according to claim 14, wherein the laminations of the sheet metal laminate units are flat and/or free of projections and/or recesses perpendicularly to and/or in parallel with a main extension plane of at least one lamination.

17. Machine component, a rotor, and/or a stator, comprising one or more stacks of laminations, produced by said method and/or comprising one or more stacks of laminations according to claim 14.

18. Electric motor comprising a housing, a rotor and a stator, wherein the rotor and/or the stator are machine components according to claim 17.

19. Drive train for a vehicle, comprising an electric motor according to claim 18.

20. Method according to claim 1, wherein before and/or after the division of the sheet metal laminate, a plurality of sheet metal laminate units are stacked one on top of the other in a stacking direction.

* * * * *